US008936009B2

(12) United States Patent
Puckett et al.

(10) Patent No.: US 8,936,009 B2
(45) Date of Patent: *Jan. 20, 2015

(54) FUEL SYSTEM HAVING DUAL FUEL PRESSURE REGULATOR

(71) Applicant: Caterpillar Inc., Peoria, IL (US)

(72) Inventors: Daniel R. Puckett, Peoria, IL (US); Joshua W. Steffen, El Paso, IL (US); Frank J. Lombardi, Metamora, IL (US); Steven T. Grant, Groveland, IL (US)

(73) Assignee: Caterpillar, Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/665,534

(22) Filed: Oct. 31, 2012

(65) Prior Publication Data
US 2014/0116523 A1 May 1, 2014

(51) Int. Cl.
F02M 21/02 (2006.01)

(52) U.S. Cl.
USPC .............. 123/525; 137/12; 137/505; 137/495

(58) Field of Classification Search
CPC . F02M 43/04; F02M 2200/46; F02M 57/023; F02M 57/025; F02M 59/466; F02M 61/182; F02M 21/0248; F02M 21/0254; F02M 47/046; F02M 2200/44; F02M 61/042; F02M 61/18; F02M 63/004; F02M 21/02; F02D 19/0694
USPC .......................... 123/525, 526, 527, 531, 1 A; 137/565.72, 544, 565.16, 495, 408, 137/479, 12, 505
See application file for complete search history.

(56) References Cited

U.S. PATENT DOCUMENTS

| 2,686,503 | A | * | 8/1954 | Reddy et al. | 123/27 GE |
|---|---|---|---|---|---|
| 4,505,249 | A | * | 3/1985 | Young | 123/527 |
| 4,606,322 | A | * | 8/1986 | Reid et al. | 123/575 |
| 4,637,353 | A | | 1/1987 | Codrington | |
| 5,546,908 | A | * | 8/1996 | Stokes | 123/480 |
| 5,727,529 | A | * | 3/1998 | Tuckey | 123/514 |
| 5,868,121 | A | | 2/1999 | Brown et al. | |
| 5,890,459 | A | * | 4/1999 | Hedrick et al. | 123/27 GE |
| 6,016,834 | A | * | 1/2000 | Leidl | 137/571 |
| 6,170,442 | B1 | * | 1/2001 | Beale | 123/46 B |

(Continued)

OTHER PUBLICATIONS

Daniel R. Puckett et al., U.S. Patent Application entitled "Fuel System Having Dual Fuel Pressure Regulator" filed on Oct. 31, 2012.

Primary Examiner — Noah Kamen
Assistant Examiner — Long T Tran
(74) Attorney, Agent, or Firm — Finnegan, Henderson, Farabow, Garrett & Dunner LLP

(57) ABSTRACT

A pressure regulator is disclosed having a body, a valve seat dividing a cavity of the body into first and second portions, and an end stop movable against a bias to selectively engage the valve seat and isolate the first and second portions. The pressure regulator may also have a first inlet port in the first portion, a first outlet port in the second portion and in fluid communication with the first portion via the valve seat, and a second inlet port in the second portion. The fuel system may also have a valve element in the second portion and movable against a spring bias based on a pressure difference between an open position and a restricted position against the end stop. The fuel system may additionally have an actuator biased to urge the valve element toward the second position and selectively actuated to move away from the valve element.

20 Claims, 4 Drawing Sheets

(56) References Cited

U.S. PATENT DOCUMENTS

| | | |
|---|---|---|
| 6,253,734 B1 * | 7/2001 | Rembold et al. ............... 123/446 |
| 6,298,833 B1 | 10/2001 | Douville et al. |
| 6,601,565 B2 * | 8/2003 | Tofan-Petre ................... 123/457 |
| 7,373,931 B2 * | 5/2008 | Lennox et al. ................. 123/525 |
| 7,463,967 B2 | 12/2008 | Ancimer et al. |
| 7,856,961 B2 | 12/2010 | Doelker et al. |
| 8,028,676 B2 | 10/2011 | Ancimer et al. |
| 8,517,050 B2 * | 8/2013 | Akagi et al. ................... 137/479 |
| 2008/0262701 A1 | 10/2008 | Williams et al. |
| 2008/0271707 A1 * | 11/2008 | Nozaki et al. ................. 123/446 |
| 2011/0017174 A1 | 1/2011 | Ulrey et al. |
| 2012/0255523 A1 * | 10/2012 | Kim et al. ...................... 123/478 |

* cited by examiner

FUEL SYSTEM HAVING DUAL FUEL PRESSURE REGULATOR

TECHNICAL FIELD

The present disclosure relates generally to a fuel system, and more particularly, to a fuel system having a dual fuel pressure regulator.

BACKGROUND

Dual fuel engines are well known in the art and combust a mixture of two different types of fuel. For example, a particular dual fuel engine can combust a mixture of a liquid fuel (e.g., diesel fuel) and a gaseous fuel (e.g., natural gas). By combusting two different types of fuel, advantages of both fuels (e.g., efficiency, power, emissions, cost, etc.) can be realized.

In order to properly control performance of a dual fuel engine, the pressures and/or flow rates of the two different fuels into the engine should be tightly regulated. Historically, the pressures and/or flow rates of the fuels have been regulated independently, for example by way of a variable displacement liquid fuel pump and by way of a gas vent. The variable displacement liquid fuel pump, however, may be too expensive and/or complex for some applications. In addition, venting of the gaseous fuel may be undesirable in some areas. Finally, it may be desirable to link the pressures and/or flow rates of the two fuels in some operations, such that desired ratios of the fuels may be provided.

One way to control the pressures and flows of a dual fuel system is described in U.S. Pat. No. 6,298,833 issued to Douville et al. on Oct. 9, 2001 (the '833 patent). In particular, the '833 patent describes a system for delivering diesel fuel and gaseous fuel through an injector into an engine. The system employs a pressure balancing device having a first chamber in fluid communication with a supply of the diesel fuel and with the injector, a second chamber isolated from the first chamber and in fluid communication with a supply of the gaseous fuel and the injector, and a piston separating the first and second chambers. The piston is movable to maintain a pressure of the diesel fuel a fixed amount higher than a pressure of the gaseous fuel. In addition, a position of the piston is sensed and used to control a diesel fuel pump, thereby maintaining the pressures of both the diesel fuel and the gaseous fuel within a desired range.

While the system of the '833 patent may adequately control diesel and gaseous fuel pressures for some applications, it may still be less than optimal. In particular, the system may not provide for a diesel only mode of operation, or allow for independent control of diesel and gaseous fuel pressures. These deficiencies may reduce the capability and functionality of the associated engine.

The disclosed fuel system and pressure regulator are directed to overcoming one or more of the problems set forth above and/or other problems of the prior art.

SUMMARY

In one aspect, the present disclosure is directed to a pressure regulator. The pressure regulator may include a body, a cavity formed in the body, a valve seat dividing the cavity into a first portion and a second portion, and an end stop disposed within the first portion. The end stop may be movable to selectively engage the valve seat and substantially isolate the first portion from the second portion. The end stop may be biased against the valve seat. The pressure regulator may also include a first inlet port disposed in the first portion, a first outlet port disposed in the second portion and in selective fluid communication with the first portion via the valve seat, and a second inlet port disposed in the second portion. The fuel system may also include a valve element disposed in the second portion and movable based on a pressure difference between the first and second inlet ports to any position between a first fully open position at which fluid is allowed to flow from the first inlet port through the first outlet port substantially unrestricted by the valve element, to a second fully restricted position against the end stop at which fluid flow from the first inlet port through the first outlet port is blocked by the end stop. The valve element may be biased toward the second position. The fuel system may additionally include an actuator biased to urge the valve element toward the second position and selectively actuated to move away from the valve element.

In another aspect, the present disclosure is directed to a fuel system. The fuel system may include a first supply of liquid fuel, a second supply of gaseous fuel, and a fuel injector configured to receive liquid and gaseous fuel from the first and second supplies. The fuel system may also include a pressure regulator in parallel fluid communication with the first and second fuel supplies and configured to selectively regulate a pressure of the liquid fuel based on a pressure of the gaseous fuel. The fuel system may further include a pump configured to pressurize and direct liquid fuel from the first supply to the regulator, a liquid fuel accumulator disposed between the pressure regulator and the injector, and a pressure relief valve fluidly connected between an output of the pump, the liquid fuel accumulator, and the first supply.

In yet another aspect, the present disclosure is directed to a method of regulating fuel pressures for an engine. The method may include directing pressurized liquid fuel from a first supply to an injector of the engine, and directing gaseous fuel from a second supply to the injector in parallel with the liquid fuel. The method may also include selectively regulating a pressure of the liquid fuel based on a pressure of the gaseous fuel, and selectively regulating the pressure of the liquid fuel independent of the pressure of the gaseous fuel. The method may additionally include selectively relieving high pressure from liquid fuel accumulator or from a liquid fuel pump to the first supply.

DETAILED DESCRIPTION

Figure 1:
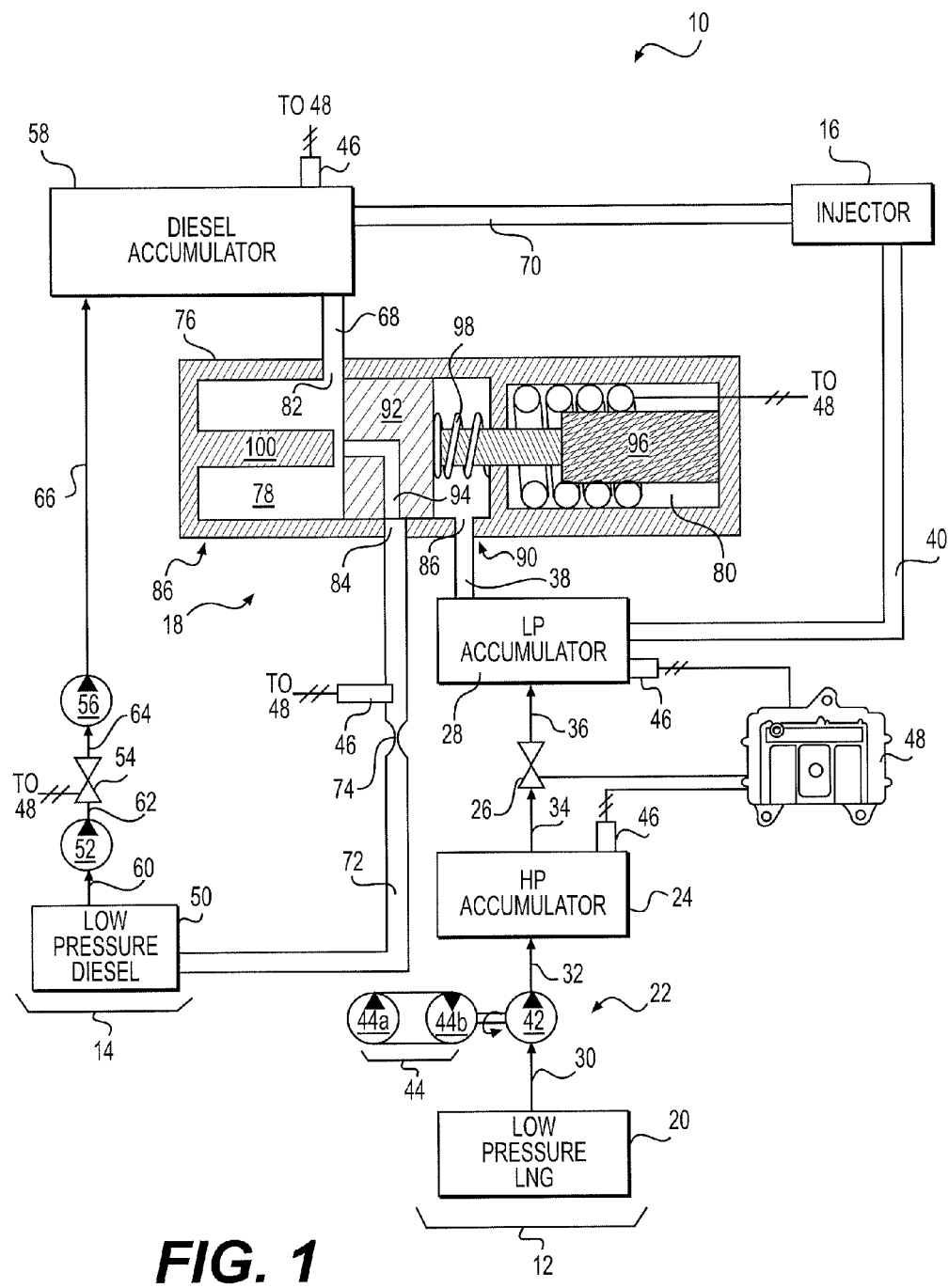
FIG. 1 is a pictorial illustration of an exemplary disclosed fuel system and dual fuel regulator.

FIG. 1 illustrates an exemplary fuel system 10 for use with a dual-fuel combustion engine (not shown), for example a gaseous and liquid fuel-powered internal combustion engine. In the disclosed exemplary embodiment, fuel system 10 provides natural gas and diesel to the combustion engine. It should be noted, however, that other gaseous and/or liquid fuels may be supplied by fuel system 10 to the engine. Fuel system 10 may include, among other things, a gaseous fuel supply circuit (GFSC) 12; a liquid fuel supply circuit (LFSC) 14; an injector 16 configured to receive natural gas only, diesel only, or both natural gas and diesel for injection into the engine; and a pressure regulator 18 fluidly connected between injector 16 and gaseous and liquid fuel supply circuits 12, 14.

GFSC 12 may include components that cooperate to deliver natural gas from a supply 20 to pressure regulator 18 and to injector 16 in parallel. These components may include, for example, a pump 22, a high-pressure accumulator 24, a metering valve 26, and a low-pressure accumulator 28. Pump 22 may be connected to supply 20 by way of a passage 30, and to high-pressure accumulator 24 by way of a passage 32. Metering valve 26 may be connected between high- and low-pressure accumulators 24, 28 by way of passages 34 and 36. Low-pressure accumulator 28 may be connected to pressure regulator 18 and to injector 16 by way of passages 38 and 40, respectively. Pump 22 may be configured to draw natural gas (or otherwise receive natural gas) from supply 20 via passage 30, and push the natural gas through passage 32 into high-pressure accumulator 24. The natural gas may then flow through passage 34, metering valve 26, and passage 36 to low-pressure accumulator 28 at a rate and/or with a pressure affected by an adjustable restriction of metering valve 26. From low-pressure accumulator 28, the natural gas may be directed in parallel to both pressure regulator 18 and injector 16 via passages 38 and 40.

Supply 20 may embody a cryogenic tank configured to hold the natural gas in a liquefied state. In the exemplary embodiment, supply 20 is an insulated tank that maintains a temperature of the natural gas below a boiling temperature of about −165° C. It is contemplated that supply 20 may be provided with conventional equipment for handling liquefied natural gas (LNG), for example chillers, heaters, circulators, ventilators, etc., as desired.

Pump 22 may be any type of pump known in the art for handling natural gas in its liquid state (LNG) and/or gaseous state. In particular, at any point between supply 20 and high-pressure accumulator 24 (e.g., upstream and/or downstream of pump 22), the LNG may gasify. In the disclosed exemplary embodiment, the LNG is gasified downstream of pump 22 and pump 22 is configured to handle only LNG. In this embodiment, pump 22 includes a fixed displacement pumping device 42 (e.g., a piston type, diaphragm type, or centrifugal type pump) that is powered by a variable speed drive 44 (e.g., a hydraulic pump 44a driven by the engine described above and connected to a hydraulic motor 44b in closed-loop fashion, motor 44b being mechanically connected to pumping device 42). With this configuration, although the displacement of pumping device 42 is fixed, the output of pump 22 may still be varied by adjusting the speed of drive 44. The speed of drive 44 may be adjusted by changing an input speed of hydraulic pump 44a and/or changing a displacement of hydraulic pump 44a or hydraulic motor 44b. It is contemplated that other types of pumps may alternatively be utilized to push natural gas through GFSC 12, if desired, for example a variably displacement pump.

Each of high- and low-pressure accumulators 24, 28 may embody pressure vessels configured to store pressurized natural gas for future use by injector 16. As natural gas in passages 32 and 36 exceeds pressures of high- and low-pressure accumulators 24, 28, respectively, the natural gas may flow into high- and low-pressure accumulators 24, 28. Because the natural gas therein is compressible, it may act like a spring and compress as more natural gas flows into high- and low-pressure accumulators 24, 28. When the pressure of the natural gas within passages 34, 38, and/or 40 drops below the pressures of high- and low-pressure accumulators 24, 28, the compressed natural gas may expand and exit high- and low-pressure accumulators 24, 28. It is contemplated that high- and low-pressure accumulators 24, 28 may alternatively embody membrane/spring-biased or bladder types of accumulators, if desired.

In the disclosed embodiment, high-pressure accumulator 24 may have a higher-pressure, as compared to low-pressure accumulator 28. Specifically, high-pressure accumulator 24 may be configured to accumulate natural gas having a pressure in the range of about 15-40 MPa, while low-pressure accumulator 28 may be configured to accumulate natural gas having a pressure that is about 1-25 MPa lower. It is contemplated, however, that other pressures may alternatively be accommodated by high- and/or low-pressure accumulators 24, 28, if desired. It is also contemplated that high- and low-pressure accumulators 24, 28 may have about the same volumes or different volumes. For example, high-pressure accumulator 24 may be significantly larger than low-pressure accumulator 28, if desired.

During operation of GFSC 12, the pressures of high- and/or low-pressure accumulators 24, 28 may be monitored. For example, one or more pressure sensors 46 may be associated with one or both of high- and low-pressure accumulators 24, 28 and configured to generate signals indicative of the pressures thereof. The signals from pressure sensors 46 may be directed to a controller 48 for further processing.

Metering valve 26 may embody an electronically controlled valve element that is movable to any position between an open flow-passing position and a closed flow-blocking position. Because high-pressure accumulator 24 may generally have a higher-pressure than low-pressure accumulator 28, moving the valve element of metering valve 26 toward the flow-passing position may result in a greater flow of natural gas into low-pressure accumulator 28. For a given consumption rate of natural gas by injector 16, a greater flow of natural gas through metering valve 26 may generally result in an increase in pressure within low-pressure accumulator 28. The valve element of metering valve 26 may be moved between the flow-passing and flow-blocking positions in response to a command signal from controller 48.

LFSC 14 may include components that cooperate to deliver diesel from a supply 50 to pressure regulator 18 and to injector 16 in parallel. These components may include, for example, a transfer pump 52, a metering valve 54, a high-pressure pump 56, and an accumulator 58. Transfer pump 52 may be connected to supply 50 by way of a passage 60, and to metering valve 54 by way of a passage 62. High-pressure pump 56 may be connected between metering valve 54 and accumulator 58 by way of passages 64 and 66. Accumulator 58 may be connected to pressure regulator 18 and to injector 16 by way of passages 68 and 70, respectively. A return passage 72 may connect pressure regulator 18 to supply 50. Transfer pump 52 may be configured to draw diesel (or otherwise receive diesel) from supply 50 via passage 60, and push the diesel through passage 62, metering valve 54, and passage 60 into high-pressure pump 56. The diesel may flow through metering valve 54 at a rate and/or with a pressure affected by a restriction of metering valve 54. From high-pressure pump 56, the diesel may be directed through accumulator 58 to both pressure regulator 18 and injector 16 in parallel via passages 68 and 70. Any diesel intentionally or inadvertently leaked from pressure regulator 18 may be directed back to supply 50 via passage 72. In some applications, a fixed or variable restriction 74 may be placed within passage 72 to allow monitoring of a rate of return of diesel fuel using a pressure sensing device (not shown). This information may be useful in limiting an amount of excess pumping, while ensuring adequate diesel fuel delivery to regulator 18 in order to maintain desired pressure control. The information may also be used to monitory diesel fuel delivery and identify fault conditions.

Supply 50 may embody a conventional tank configured to hold diesel. It is contemplated that supply 50 may be provided with conventional equipment for handling diesel, for example filters, separators, circulators, ventilators, etc., as desired.

Transfer pump 52 may be configured to provide low-pressure feed to high-pressure pump 56. In one exemplary embodiment, transfer pump 52 may be an electrically powered diaphragm pump that is selectively turned on and off (i.e., cycled) based on a pressure within LFSC 14. It is contemplated, however, that transfer pump 52 may alternatively be another type of pump known in the art, if desired.

Metering valve 54, like metering valve 26, may include an electronically controlled valve element movable to any position between an open flow-passing position and a closed flow-blocking position. Because metering valve 54 may be located at an inlet of high-pressure pump 56, metering valve 54 may function to regulate an output of high-pressure pump 56. That is, by moving the valve element of metering valve 54 toward the flow-passing position, high-pressure pump 56 may be capable of drawing in, pressurizing, and discharging a greater flow rate of diesel into accumulator 58. For a given consumption rate of natural gas by injector 16, a greater discharge rate of diesel from high-pressure pump 56 may generally result in an increase in pressure within accumulator 58. The valve element of metering valve 54 may be moved between the flow-passing and flow-blocking positions in response to a command signal from controller 48.

High-pressure pump 56 may be configured to receive the low-pressure feed from transfer pump 52 (i.e., by way of metering valve 54), and increase the pressure of the diesel to, in some embodiments, about 100 MPa. In the disclosed exemplary embodiment, high-pressure pump 56 is a fixed-displacement, piston-type pump. It is contemplated, however, that high-pressure pump 56 may alternatively be any other type of pump known in the art, for example a fixed- or variable-displacement piston-pump, centrifugal pump, or another type of pump that is electrically and/or mechanically driven by the engine described above. It is also contemplated that, if high-pressure pump 56 were to be replaced with a variable-displacement pump, it may be possible to omit metering valve 54 from LFSC 14, if desired.

Accumulator 58 may embody a pressure vessel filled with a compressible gas that is configured to store pressurized diesel for future use by injector 16. The compressible gas may include, for example, nitrogen, argon, helium, or another appropriate compressible gas. As diesel in passage 66 exceeds a pressure of accumulator 58, the diesel may flow into accumulator 58. Because the gas therein is compressible, it may act like a spring and compress as the diesel flows into accumulator 58. When the pressure of the diesel within passage 70 drops below the pressure of accumulator 58, the compressed gas may expand and urge the diesel from within accumulator 58 to exit. In general, a pressure of diesel within accumulator 58 may be maintained higher than a pressure of natural gas within high- and low-pressure accumulators 24, 28. For example, the diesel pressure may be maintained about 5 MPa higher than the natural gas pressure during normal operation (e.g., within a range of about 20-40 MPa). And during a diesel-only mode of operation, as will be described in more detail below, the diesel pressure may be raised to about 80-100 MPa within accumulator 58. It is contemplated that accumulator 58 may alternatively simply be a tank or another type of accumulator such as a membrane/spring or bladder type of accumulator, if desired.

During operation of LFSC 14, the pressures of accumulator 58 and/or return passage 72 may be monitored. For example, one or more pressure sensors 46 may be associated with one or both of accumulator 58 and return passage 72 (e.g., at a location upstream of restriction 74) and configured to generate signals indicative of the pressures thereof. The signals from pressure sensors 46 may be directed to controller 48 for further processing.

Pressure regulator 18 may be an assembly of components that function together to regulate pressures within fuel system 10. These components may include, among other things, a body 76 having a primary cavity 78 and a secondary cavity 80 formed therein. Primary cavity 78 may be configured to selectively pass a flow of diesel at a first end 86 from a first inlet port 82 to an outlet port 84, and to receive natural gas at an opposing second end 90 by way of an inlet port 88. A valve element 92 may be disposed within cavity 78 to separate first and second ends 86, 90. Valve element 92 may include an internal passage 94 that selectively connects first inlet port 82 with outlet port 84 based on a position of valve element 92. Secondary cavity 80 may be configured to receive an actuator 96, for example a hydro-mechanical actuator (such as a hydraulic piston) or an electronic actuator (such as a solenoid) that exerts a biasing force on valve element 92 to move valve element 92 toward first end 86 of cavity 78. A spring 98 may exert an additional biasing force on valve element 92 that works in concert with the biasing force of electronic actuator 96. An end stop 100 may be disposed within cavity 78 at first end 86 and configured to be selectively engaged by an axial end of valve element 92 at passage 94, thereby blocking flow through passage 94. In the embodiment of FIG. 1, end stop 100 may be a fixed end stop that is integral with or otherwise rigidly joined to body 76.

Figure 2:
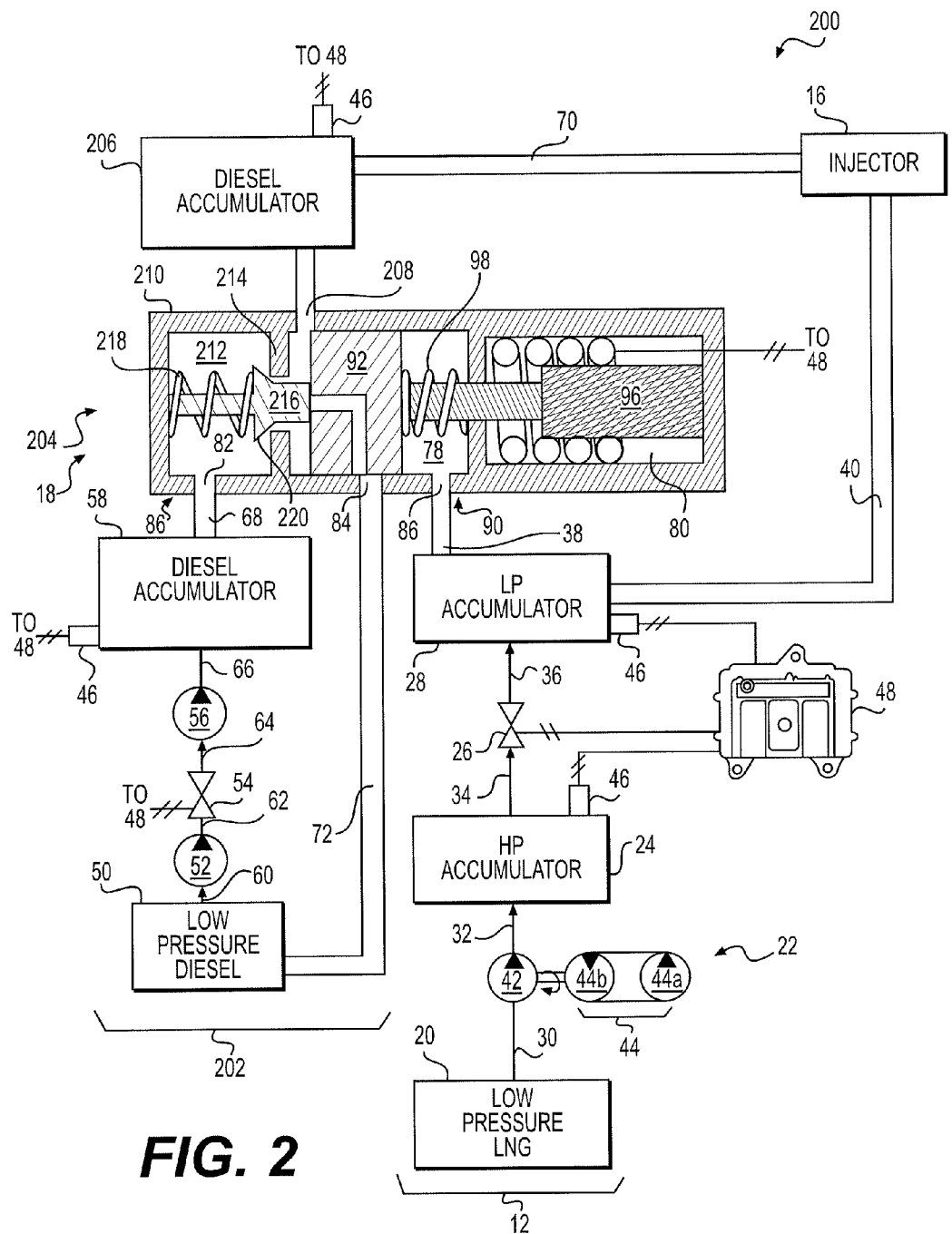
FIG. 2 is a pictorial illustration of another exemplary disclosed fuel system and dual fuel regulator.

An alternative fuel system 200 is shown in FIG. 2. Like fuel system 10 of FIG. 1, fuel system 200 may include GFSC 12. In contrast to fuel system 10, however, fuel system 200 may include a slightly different LFSC 202 and a different pressure regulator 204.

LFSC 202, like LFSC 14, may include supply 50, transfer pump 52, metering valve 54, high-pressure pump 56, and accumulator 58. However, rather than directing diesel to pressure regulator 18 and injector 16 in parallel, accumulator 58 may instead send diesel to only pressure regulator 18. In addition, LFSC 202 may include a second accumulator 206 that receives diesel from pressure regulator 18 (i.e., from a second outlet port 208) and discharges diesel toward injector 16 via passage 70.

Pressure regulator 204 of FIG. 2, like pressure regulator 18 of FIG. 1, may include a body 210. However, body 210 may be divided into primary cavity 78, secondary cavity 80, and a tertiary cavity 212. Primary cavity 78 may be separated from tertiary cavity 212 by a valve seat 214, and configured to selectively pass a flow of diesel from first inlet port 82 through an opening in valve seat 214 to outlet ports 84 and 208. Pressure regulator 204 may also include valve element 92, actuator 96, spring 98, and an end stop 216. End stop 216 may be disposed within tertiary cavity 212 and protrude through the opening in valve seat 214 into primary cavity 78 to selectively engage the axial end of valve element 92 at passage 94. In this arrangement, end stop 216 may be separate from body 210 and biased toward valve element 92 by a spring 218. When a sealing surface 220 of end stop 216 engages seat 214, flow from inlet port 82 to outlet ports 84 and 208 may be blocked.

Figure 3:
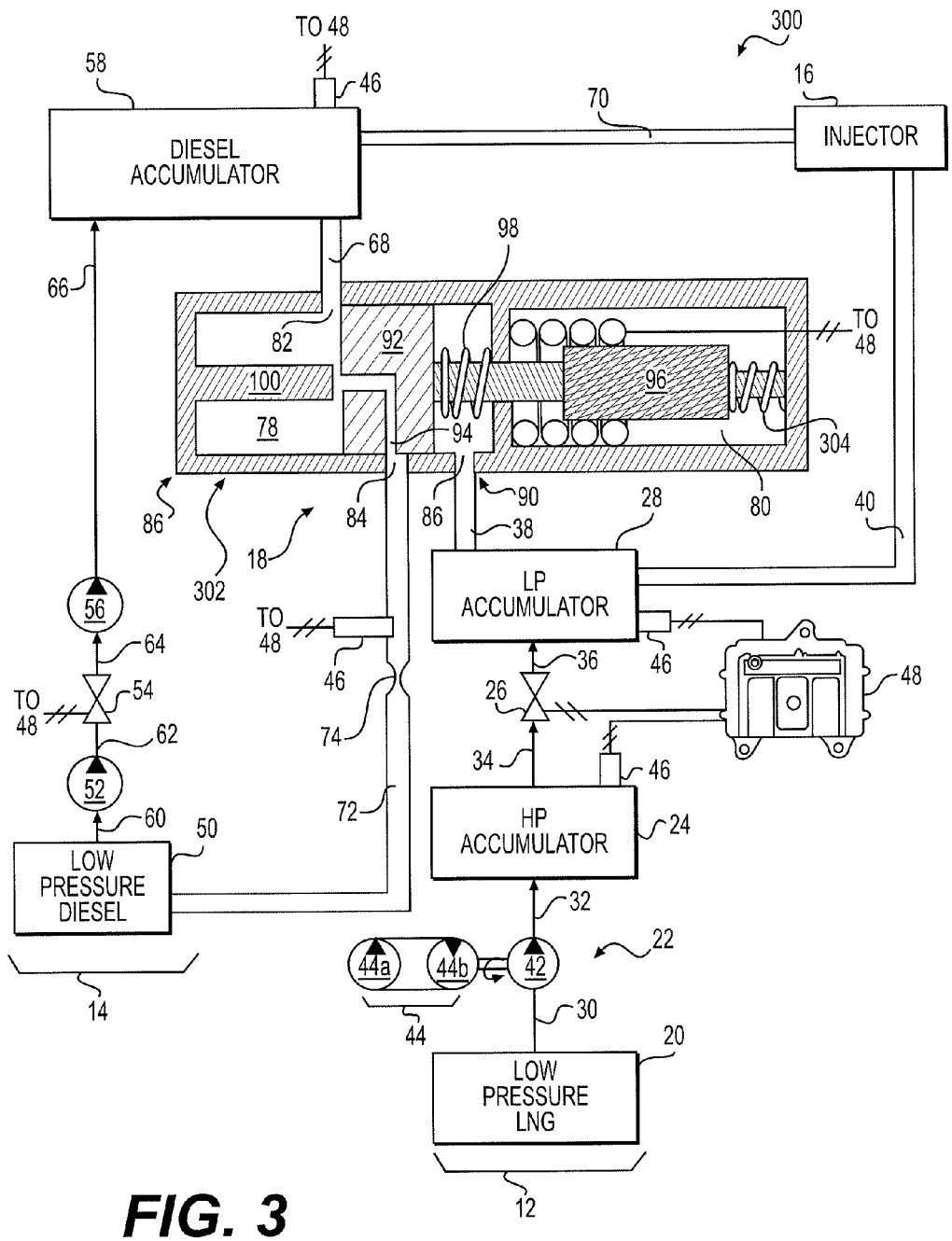
FIG. 3 is a pictorial illustration of another exemplary disclosed fuel system and dual fuel regulator.

Another alternative fuel system 300 is shown in FIG. 3. Like fuel system 10 of FIG. 1, fuel system 300 may include GFSC 12 and LFSC 14. In contrast to fuel system 10, however, fuel system 300 may include a slightly different pressure regulator 302.

Pressure regulator 302 of FIG. 3, like pressure regulator 18 of FIG. 1, may include body 76 forming primary and secondary cavities 78, 80, valve element 92, actuator 96, and end stop 100. However, in contrast to pressure regulator 18, pressure regulator 302 may additionally include a spring 304 located at a base end of actuator 96. Spring 304 may be configured to exert additional bias, by way of actuator 96, against the end of valve element 92, urging valve element 92 toward end stop 100. The bias of spring 304 may be greater than the bias of spring 98 and/or the bias of actuator 96. In one example, the bias of spring 304 may be about twenty times greater than the bias of spring 98.

Figure 4:
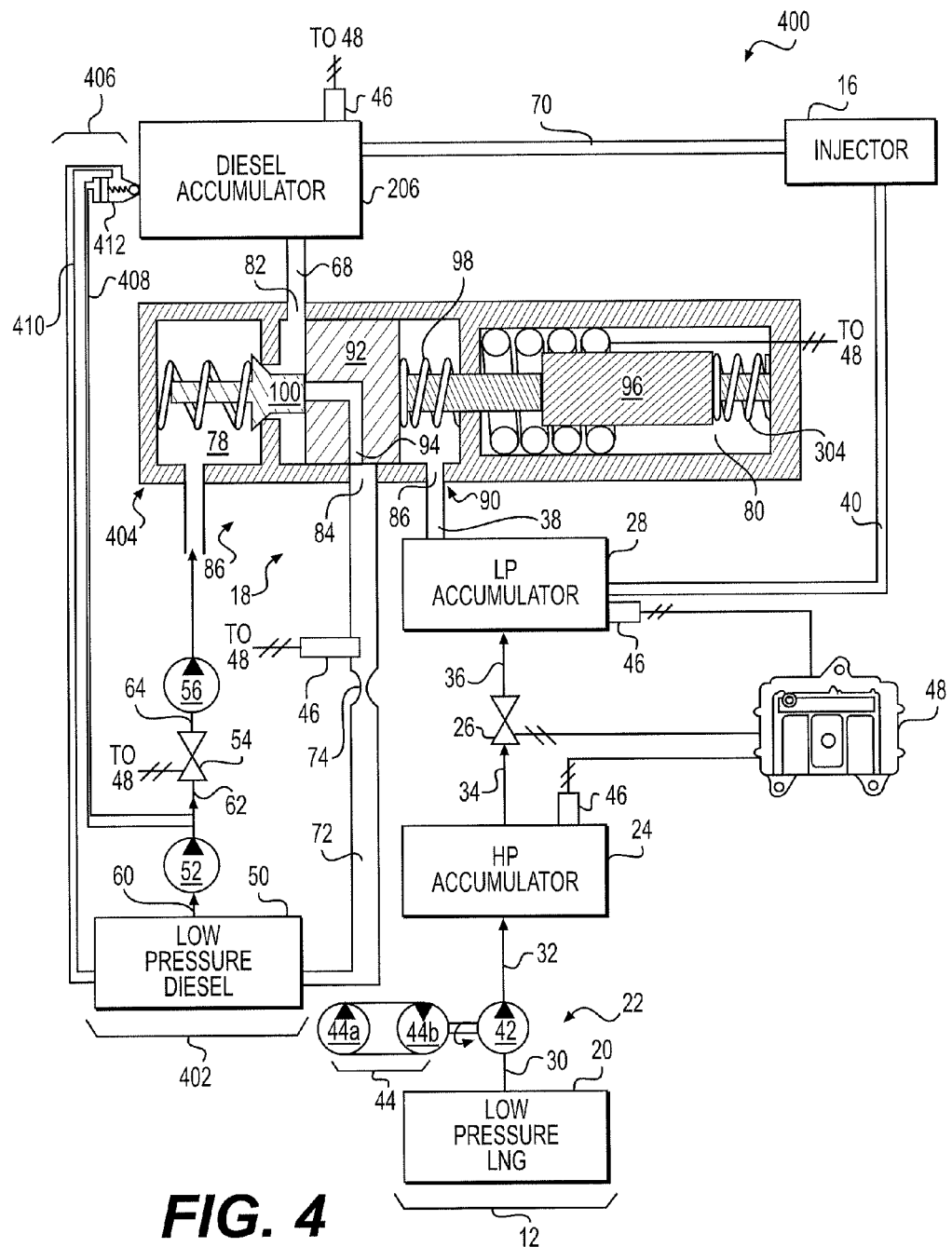
FIG. 4 is a pictorial illustration of another exemplary disclosed fuel system and dual fuel regulator.

Another alternative fuel system 400 is shown in FIG. 4. Like fuel system 202 of FIG. 2, fuel system 400 may include GFSC 12. In contrast to fuel system 202, however, fuel system 400 may include a slightly different LFSC 402 and a different pressure regulator 404.

LFSC 402, like LFSC 202, may include supply 50, transfer pump 52, metering valve 54, high-pressure pump 56, and accumulator 206. However, accumulator 58 may be omitted from LFSC 402. That is, high-pressure pump 56 may discharge directly into passage 68, rather than directing diesel into accumulator 58 via passage 66.

Pressure regulator 404 of FIG. 4, like pressure regulator 204 of FIG. 2, may include body 210 divided into primary cavity 78, secondary cavity 80, and tertiary cavity 212; valve seat 214, valve element 92; actuator 96; spring 98; and end stop 216. In addition, pressure regulator 404 may include spring 304 shown in pressure regulator 302 of FIG. 3.

Additionally, fuel system 400 may include a pressure relief circuit 406. Pressure relief circuit 406 may include, among other things, a supply passage 408, a return passage 410, and a check valve element 412 disposed at a junction of supply and return passages 408, 410. Supply passage 408 may extend from a location downstream of transfer pump 52 to check valve element 412, while return passage 410 may extend from check valve element 412 to supply 50. Check valve element 412 may be in communication with accumulator 206, supply passage 408, and return passage 410. Based on a pressure difference between accumulator 206, supply passage 408, and return passage 410, check valve element 412 may selectively move from a flow-blocking position toward a flow-passing position at which fluid from within accumulator 206 and/or within supply passage 408 is relieved back to supply 50 via return passage 410. It is contemplated that, although pressure relief circuit 406 is shown only in combination with fuel system 400, pressure relief circuit 406 could likewise be used in conjunction with any of fuel systems 10, 200, and/or 300, if desired.

INDUSTRIAL APPLICABILITY

The disclosed fuel systems and pressure regulators find potential application in any dual-fuel power generation application. The disclosed fuel systems and pressure regulators may help provide for responsive simultaneous control over diesel and natural gas pressures. In addition, the disclosed fuel systems and pressure regulators may help provide for operation in a diesel only mode of operation. Operation of fuel system 10 will now be described.

Referring to FIG. 1, operation of fuel system 10 may begin with the drawing of LNG and diesel from supplies 20 and 50 by pumps 22 and 52, respectively. Within GFSC 12, the LNG drawn by pump 22 may be gasified and directed into high-pressure accumulator 24, passed through metering valve 26, and directed into low-pressure accumulator 28. From low-pressure accumulator 28, the natural gas may be directed into cavity 78 of pressure regulator 18 to act on an end surface of valve element 92 at second end 90. Substantially simultaneously, natural gas may be directed from accumulator 28 into injector 16. Within LFSC 14, the diesel drawn by transfer pump 52 may be directed through metering valve 54 to high-pressure pump 56, where the pressure of the diesel may be increased. From high-pressure pump 56, the diesel may be directed into accumulator 58. Accumulator 58 may then feed diesel into cavity 78 of pressure regulator to act on an opposing end surface of valve element 92 at first end 86. Substantially simultaneously, diesel may be directed from accumulator 58 to injector 16.

Pressure regulator 18 may be configured to regulate a pressure of the diesel directed to injector 16 based on a pressure of the natural gas also directed to injector 16. In particular, with both fuels acting in opposite directions on about the same surface areas of valve element 92, valve element 92 may be biased by a difference in pressures toward the lower-pressure fuel. For example, as natural gas pressures begin to rise (relative to diesel pressures), a greater force may be generated that functions to push valve element 92 toward first end 86 (i.e., leftward in FIG. 1). Likewise, as the natural gas pressures begin to fall, the force functioning to push valve element 92 toward first end 86 may likewise fall. As valve element 92 moves towards first end 86, passage 94 may become more restricted by the engagement of valve element 92 with end stop 100. This restriction may reduce an amount of diesel that passes from accumulator 58 through inlet port 82 and passage 94 to outlet port 84. And, a reduction in the flow of diesel from accumulator 58, for a given supply rate of diesel into accumulator 58, may result in an increase in diesel pressure within accumulator 58. Likewise, as valve element 92 moves away from first end 86 of cavity 78 (as caused by a fall in natural gas pressure relative to diesel pressure), passage 94 may become less restricted by end stop 100. This reduction in restriction may allow for an increased flow of diesel to pass from accumulator 58 through inlet port 82 and passage 94 to outlet port 84. And, an increase in the flow of diesel from accumulator 58, for a given supply rate of diesel into accumulator 58, may result in a drop in diesel pressure. Accordingly, a change in natural gas pressure may result in a corresponding change in diesel pressure.

The bias of spring 98 and/or actuator 96 may affect how much pressure difference is allowed between the diesel and natural gas. In particular, the spring bias, together with the actuator bias may offset the balance between forces acting on valve element 92. For example, in order to move valve element 92 to a less restricting position (i.e., rightward in FIG. 1), the forces caused by diesel pressure acting on valve element 92 at first end 86 must overcome the forces caused by natural gas pressure acting at second end 90, plus the bias of spring 98, plus the bias of actuator 96. Accordingly, the bias of spring 98 and/or the bias of actuator 96 may be selected to affect a desired pressure offset or difference between the diesel and natural gas provided to injector 16.

In some embodiments, the bias of actuator 96 may be adjusted so as to vary the pressure difference between the diesel and natural gas. In particular, controller 48 may be configured to vary an amplitude and/or frequency of the command signal sent to actuator 96 to thereby adjust the bias of actuator 96. In this manner, the difference in fuel pressures may be adjusted to accommodate different modes of operation.

The natural gas pressure within fuel system 10 may be adjusted in different ways. For example, the operation of pump 22 may be adjusted (e.g., the displacement and/or speed of pump 44a and/or motor 44b may be adjusted) to thereby vary a pressure and/or flow rate of natural gas being discharged into high-pressure accumulator 24. In addition or alternatively, the restriction placed the natural gas flow between high- and low-pressure accumulators 24, 28 may be varied by metering valve 26. By placing a higher restriction on the flow of natural gas between high- and low-pressure accumulators 24, 28, a greater pressure drop between high- and low-pressure accumulators 24, 28 may be achieved. The opposite may also be true. In this manner, natural gas pressure may be adjusted without having to vent natural gas to the atmosphere.

The diesel pressure within fuel system 10 may also be adjusted in different ways. As described above, the offset or difference between natural gas pressure and diesel pressure may be adjusted through the use of actuator 96. During normal operations, diesel pressure may always be somewhat higher than natural gas pressure, and the output of high-pressure pump 56 may be such that the demand of injector 16 is satisfied, the desired pressure difference is maintained, and some diesel is returned (i.e., leaks back) to supply 50 via regulator 18 and return passage 72. This control may be facilitated by controller 48 via feedback from the various pressure sensors 46. Alternatively, actuator 96 may be commanded to extend a maximum amount (i.e., to move leftward in FIG. 1 as much as possible), such that valve element 92 is caused to engage end stop 100 and passage 94 is completely blocked by the engagement (i.e., such that no diesel leaks back to supply 50 via regulator 18 and return passage 72). In this situation, fluctuations in natural gas pressure within pressure regulator 18 may have little, if any, affect on diesel pressures. Instead, the diesel pressures may be varied during this condition solely by adjusting the restriction of metering valve 54 (i.e., by inlet metering of high-pressure pump 56).

Fuel system 10 may be capable of operation in a diesel only mode. This mode may be desirable when, for example, the supply of natural gas has been depleted, during startup, or when a failure has occurred within GFSC 12. When any of these situations is detected by controller 48, for example by way of pressure sensors 46, actuator 96 may again be commanded by controller 48 to extend the maximum amount (i.e., to move leftward in FIG. 1 as much as possible), such that valve element 92 is caused to engage end stop 100 and passage 94 is completely blocked by the engagement. During this condition, the restriction placed on the flow of diesel into high-pressure pump 56 by metering valve 54 may be reduced, if not completely eliminated, such that high-pressure pump 56 draws in and discharges diesel at an increased rate. This increased rate of diesel supply into accumulator 58, in combination with a complete reduction in leakage through pressure regulator 18 back to supply 50, may cause a corresponding increase in pressure within accumulator 58. The pressure increase that occurs at this time may result in a sufficient supply of chemical energy passing through injector 16 to the corresponding engine, such that little or no natural gas is required. In some situations, the diesel only mode of operation may be an emergency mode of operation only, intended to provide a "limp home" capability that may not be suitable for normal every day operation.

Operation of fuel system 200 of FIG. 2 may be similar to the operation described above with respect to FIG. 1. However, in addition to the natural gas pressure (together with the bias of spring 98 and actuator 96) controlling an amount of diesel leaked back to supply 50, the natural gas pressure may also control an amount of diesel passed from accumulator 58 to accumulator 206 in fuel system 200. In particular, as natural gas pressure increases within pressure regulator 204 and/or the bias of actuator 96 is caused to increase and valve element 92 is forced to move toward first end 86, in addition to restricting the flow of leaking diesel through passage 94 back to supply 50, this movement may also function to push end stop 216 away from seat 214. This movement (leftward movement in FIG. 2) of end stop 216 away from seat 214 may increase a flow rate of diesel from inlet port 82 to outlet port 208 and into accumulator 206. Thus pressure regulator 204 may enhance responsiveness by restricting leakage back to supply 50 and simultaneously increasing flow from accumulator 58 to accumulator 206. The opposite may also be true. During operation of fuel system 200, metering valve 54 may be regulated such that a pressure of accumulator 58 is maintained a desired amount higher than a pressure of accumulator 206.

Operation of fuel system 300 may also be similar to operation of fuel system 10 described above. However, in contrast to fuel system 10, actuator 96 of fuel system 300 may be a normally closed actuator. That is, actuator 96 may be biased toward valve element 92 by spring 304, and a command signal from controller 48 may result in reverse movement of actuator 96. In this configuration, during an electrical failure of fuel system 300, actuator 96 may be forced to its maximum extended position against valve element 92 by spring 304, thereby providing for the diesel only (i.e., limp home) capability during the electrical failure.

In addition, spring 304 of fuel system 300 may provide pressure relief functionality for LFSC 14. In particular, during a situation when spring 304 is forcing valve element 92 to its maximum extended position, a significant pressure spike within LFSC 14 may cause valve element 92 to move in reverse direction and compress spring 304 until some amount of diesel escapes pressure regulator 18 and leaks back to supply 50. This leakage may result in a reduced pressure within LFSC 14 and provide some component protection against damaging extremes.

Fuel system 400 may have all of the same functionality, modes of operation, and protection of fuel systems 10, 200, and 300, with additional pressure relief capability. In particular, when a pressure of diesel within accumulator 206 and/or supply passage 408 exceeds a pressure within return passage 410 by an amount greater than a spring bias of check valve element 412, check valve element 412 may move from a flow-blocking position toward a flow-passing position at which fluid from within accumulator 206 and/or within supply passage 408 is relieved back to supply 50 via return passage 410. This capability may provide extra protection to transfer pump 52, metering valve 54, high-pressure pump 56, pressure regulator 18, and/or fuel injector 16.

It will be apparent to those skilled in the art that various modifications and variations can be made to the disclosed fuel system and regulator. Other embodiments will be apparent to those skilled in the art from consideration of the specification and practice of the disclosed fuel system and regulator. It is intended that the specification and examples be considered as exemplary only, with a true scope being indicated by the following claims and their equivalents.

What is claimed is:

1. A pressure regulator, comprising:
   a body;
   a cavity formed in the body;
   a valve seat dividing the cavity into a first cavity portion and a second cavity portion;

an end stop disposed within the first cavity portion and movable to selectively engage the valve seat and substantially isolate the first cavity portion from the second cavity portion, the end stop being biased against the valve seat;

a liquid fuel inlet port disposed in the first cavity portion;

a first outlet port disposed in the second cavity portion and in selective fluid communication with the first cavity portion via the valve seat;

a gaseous fuel inlet port disposed in the second cavity portion;

a valve element disposed in the second cavity portion and movable based on a pressure difference between the liquid and gaseous fuel inlet ports to any position between a first fully open position at which fluid is allowed to flow from the liquid fuel inlet port through the first outlet port substantially unrestricted by the valve element, to a second fully restricted position against the end stop at which fluid flow from the liquid fuel inlet port through the first outlet port is blocked by the end stop, wherein the valve element is biased toward the second position; and an actuator biased to urge the valve element toward the second position and selectively actuated to move away from the valve element.

2. The pressure regulator of claim 1, further including a second outlet port disposed in the second cavity portion and in selective fluid communication with the first cavity portion via the valve element and the valve seat.

3. The pressure regulator of claim 2, wherein the valve element has a passage formed therein fluidly connecting opposing ends of the second cavity portion.

4. The pressure regulator of claim 1, wherein fluid at the liquid fuel inlet port is substantially isolated from fluid at the gaseous fuel inlet port.

5. The pressure regulator of claim 1, wherein the biasing force of the actuator is variable.

6. The pressure regulator of claim 1, wherein the bias acting on the actuator is greater than the bias acting on the valve seat.

7. The pressure regulator of claim 6, wherein the bias acting on the actuator is about twenty times the bias acting on the valve seat.

8. A fuel system, comprising:
a first supply of liquid fuel;
a second supply of gaseous fuel;
a fuel injector configured to receive liquid and gaseous fuel from the first and second supplies;
a pressure regulator in parallel fluid communication with the first and second fuel supplies, the pressure regulator being configured to selectively regulate a pressure of the liquid fuel based on a pressure of the gaseous fuel;
a pump configured to pressurize and direct liquid fuel from the first supply to the regulator;
a liquid fuel accumulator disposed between the pressure regulator and the injector; and
a pressure relief valve fluidly connected between an output of the pump, the liquid fuel accumulator, and the first supply.

9. The fuel system of claim 8, wherein the pressure relief valve is configured to selectively relieve liquid fuel from the output of the pump or the liquid fuel accumulator to the first supply.

10. The fuel system of claim 9, wherein:
the pump is a transfer pump;
the fuel system further includes a high-pressure pump configured to receive low-pressure feed from the transfer pump; and
the pressure relief valve is fluidly connected to the output of the transfer pump at a location upstream of the high-pressure pump.

11. The fuel system of claim 10, wherein the pressure regulator is further configured to selectively block pressure regulation of the liquid fuel by the gaseous fuel.

12. The fuel system of claim 10, further including a metering valve disposed between the transfer pump and the high-pressure pump and configured to selectively adjust an output of the high-pressure pump based on a desired pressure of the liquid fuel in the liquid-fuel accumulator.

13. The fuel system of claim 12, further including a leak passage fluidly connecting an outlet of the pressure regulator with the first supply.

14. The fuel system of claim 12, wherein:
the metering valve is a first metering valve; and
the fuel system further includes:
a high-pressure gas accumulator fluidly connected between the second supply and the pressure regulator;
a low-pressure accumulator fluidly connected between the high-pressure accumulator and the pressure regulator; and
a second metering valve fluidly connected between the high- and low-pressure accumulators.

15. The fuel system of claim 14, further including a variable output pump fluidly connected between the second supply and the high-pressure accumulator.

16. The fuel system of claim 14, wherein the low-pressure accumulator has a first outlet connected to the pressure regulator and a second outlet connected to the fuel injector.

17. A method of regulating fuel pressures for an engine, comprising:
directing pressurized liquid fuel from a first supply to an injector of the engine;
directing gaseous fuel from a second supply to the injector in parallel with the liquid fuel;
selectively regulating a pressure of the liquid fuel based on a pressure of the gaseous fuel;
selectively regulating the pressure of the liquid fuel independent of the pressure of the gaseous fuel; and
selectively relieving high pressure from a liquid fuel accumulator or from a liquid fuel pump to the first supply.

18. The method of claim 17, wherein selectively regulating the pressure of the liquid fuel independent of the pressure of the gaseous fuel includes:
substantially isolating the liquid fuel from the gaseous fuel upstream of the injector; and
metering liquid fuel from the first supply to the injector at a location downstream of the liquid fuel pump.

19. The method of claim 18, wherein selectively regulating the pressure of the liquid fuel based on the pressure of the gaseous fuel includes:
directing the liquid and gaseous fuels through a regulator; and
selectively leaking an amount of the liquid fuel back to the first supply based on the pressure of the gaseous fuel in the regulator.

20. The method of claim 18, wherein:
directing gaseous fuel from the second supply to the injector includes directing gaseous fuel from a high-pressure accumulator through a low-pressure accumulator to the injector; and selectively restricting a flow of gaseous fuel from the high-pressure accumulator to the low-pressure accumulator.

\* \* \* \* \*